(12) United States Patent
Gruebl et al.

(10) Patent No.: US 7,950,600 B2
(45) Date of Patent: May 31, 2011

(54) DEVICE AND METHOD FOR COMMINUTING COARSELY CRUSHED POLYCRYSTALLINE SILICON

(75) Inventors: Peter Gruebl, Triftern (DE); Rainer Hoelzlwimmer, Neuoetting (DE)

(73) Assignee: Wacker Chemie AG, Munich (DE)

( * ) Notice: Subject to any disclaimer, the term of this patent is extended or adjusted under 35 U.S.C. 154(b) by 168 days.

(21) Appl. No.: 12/295,463

(22) PCT Filed: Mar. 14, 2007

(86) PCT No.: PCT/EP2007/052408
§ 371 (c)(1),
(2), (4) Date: Sep. 30, 2008

(87) PCT Pub. No.: WO2007/113087
PCT Pub. Date: Oct. 11, 2007

(65) Prior Publication Data
US 2009/0114748 A1    May 7, 2009

(30) Foreign Application Priority Data

Mar. 30, 2006  (DE) .......................... 10 2006 014 874

(51) Int. Cl.
*B02C 19/00* (2006.01)
(52) U.S. Cl. .......................................... 241/30; 241/294
(58) Field of Classification Search ................. 117/200; 241/30, 301, 235, 293–295; 3/200
See application file for complete search history.

(56) References Cited

U.S. PATENT DOCUMENTS

| 4,617,709 A | 10/1986 | Gundlach |
| 4,871,117 A | 10/1989 | Baueregger et al. |
| 7,270,706 B2 * | 9/2007 | Andrejewski et al. .......... 117/20 |

FOREIGN PATENT DOCUMENTS

| AT | 393 520 B | 11/1991 |
| DE | 12 21 081 B | 7/1966 |
| DE | 38 11 091 A1 | 10/1989 |
| DE | 197 09 263 A1 | 9/1998 |
| DE | 197 36 087 A1 | 2/1999 |
| GB | 2 025 260 A | 1/1980 |
| JP | 57 067019 A | 4/1982 |
| JP | 57 067019 A1 | 4/1982 |

OTHER PUBLICATIONS

English Abstract corresponding to AT 393 520 B.
English Abstract corresponding to DE 12 21 081 B.
English Abstract corresponding to DE 197 09 263 A1.
English Abstract corresponding to DE 197 36 087 A1.

* cited by examiner

*Primary Examiner* — Mark Rosenbaum
(74) *Attorney, Agent, or Firm* — Brooks Kushman P.C.

(57) ABSTRACT

Polysilicon is crushed with a minimum of manual and machine crushing steps by utilizing a large diameter roll crusher, the circumferential crushing surface of which is formed of a plurality of reversibly mounted, close fitting hard metal plates. Reproducible crushing along with such low metal contamination that subsequent cleaning of the crushed polysilicon is not necessary are both obtained.

13 Claims, 3 Drawing Sheets

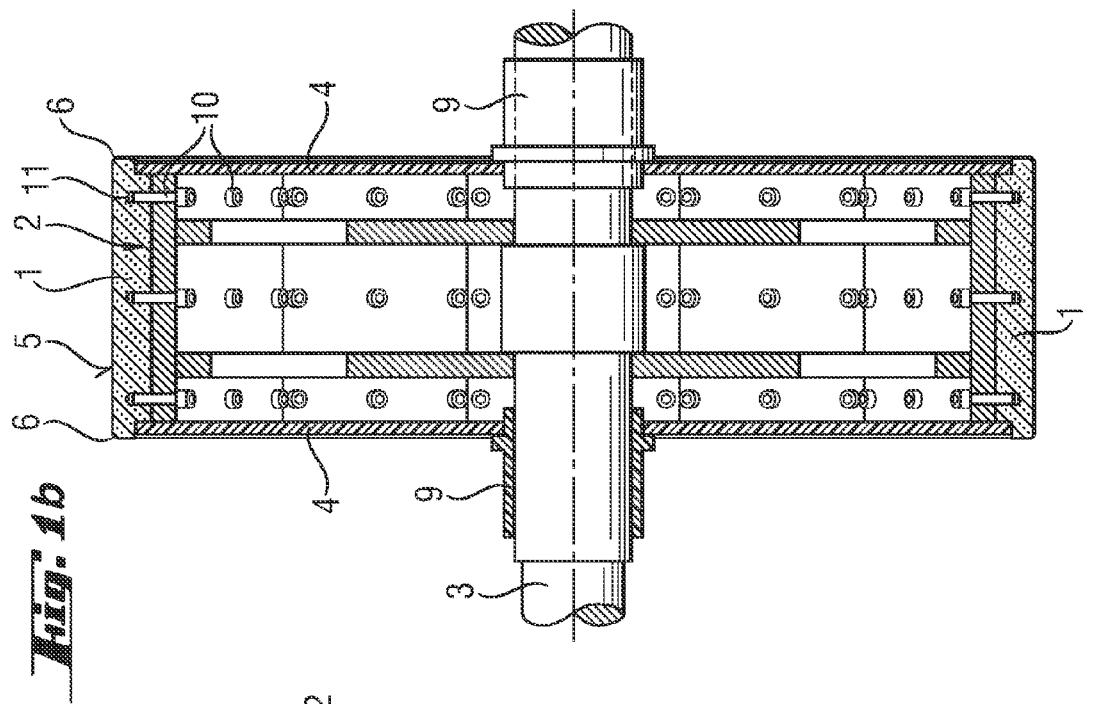
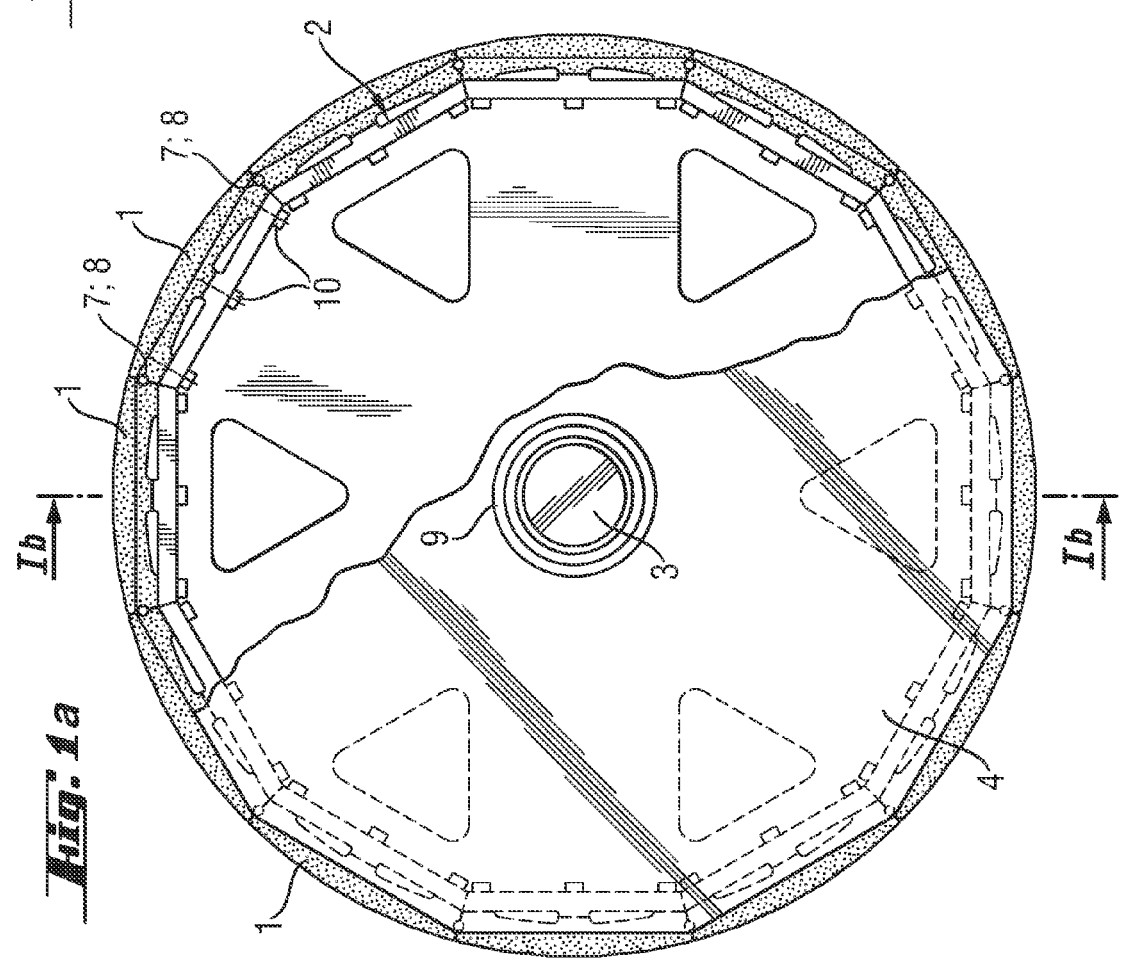

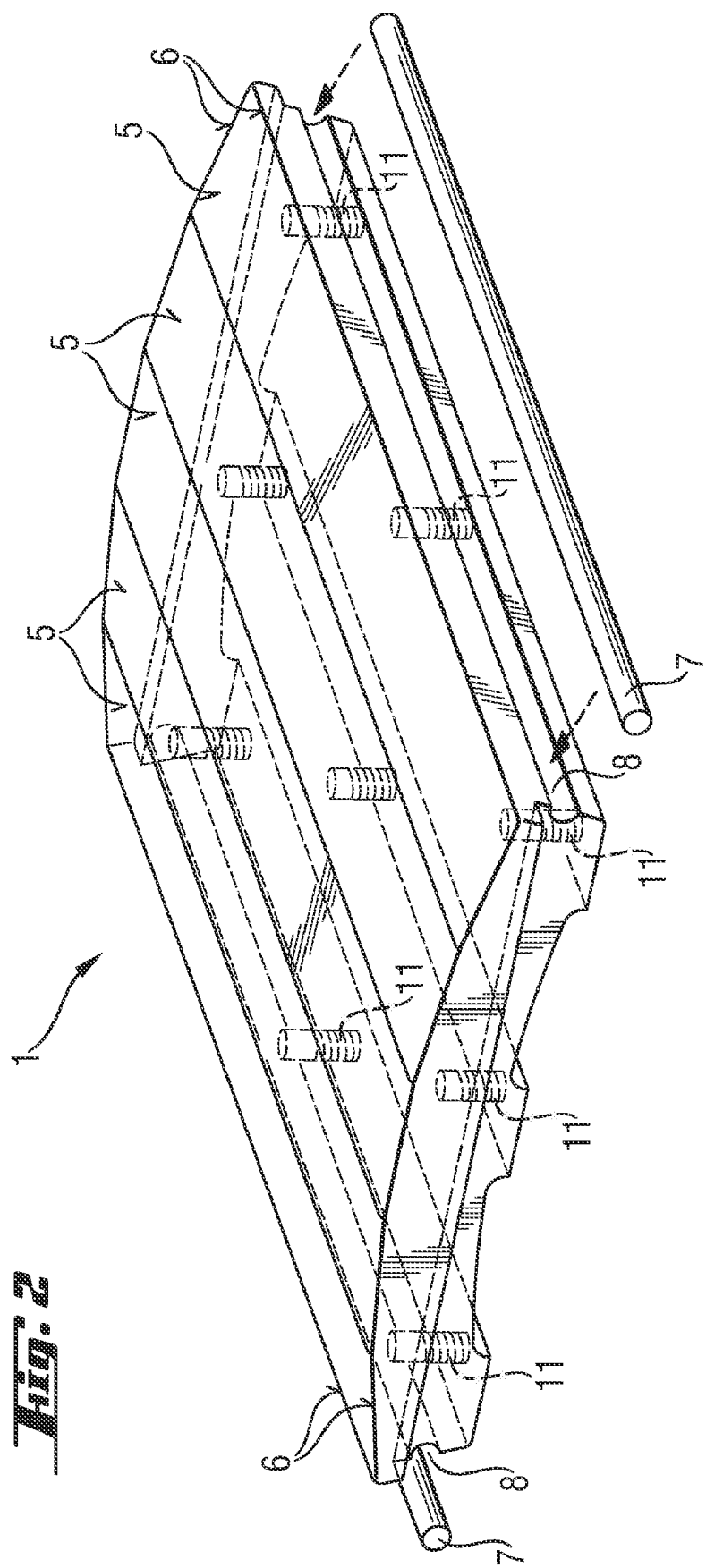

DEVICE AND METHOD FOR COMMINUTING COARSELY CRUSHED POLYCRYSTALLINE SILICON

CROSS-REFERENCE TO RELATED APPLICATION

This application is the U.S. national phase of PCT Appln. No. PCT/EP2007/052408 filed Mar. 14, 2007 which claims priority to German application DE 10 2006 014 874.6 filed Mar. 30, 2006.

BACKGROUND OF THE INVENTION

1. Field of the Invention

The invention relates to a device and a method for comminuting coarsely crushed polycrystalline silicon of such a purity that it can be used directly, i.e. without subsequent cleaning, for photovoltaic applications.

2. Description of the Related Art

Polycrystalline silicon (polysilicon) is usually produced by gas vapor deposition in a Siemens reactor. This involves depositing high-purity silane or chlorosilane on a hot substrate (preferably silicon), so that solid rods, ingots or slabs are obtained. Before this polysilicon can be used in crystallization processes, it must be comminuted. This usually causes it to be contaminated by abraded matter, with the result that the contaminants on the surface have to be removed by cleaning methods.

Polysilicon that can be used directly in the crystallization processes (i.e. without subsequent cleaning) and is suitable for solar applications, i.e. is very pure (total metallic contamination typically <10 ppba) could until now only be obtained by laborious, personnel-intensive manual comminution. In a first step, a silicon rod, as obtained from a Siemens depositing reactor, was pre-crushed with a hand hammer and subsequently post-comminuted to the required size of fragments by hand with a riveting hammer. This manually produced coarse crushed material could be further comminuted mechanically by feeding it to a machine.

Previously described mechanical crushing methods that are suitable for comminuting coarsely crushed polycrystalline silicon, for example customary jaw crushers or roll crushers, either cause excessive metallic surface contamination (conventional jaw crushers about 500 to 1000 parts per billion atoms (ppba), conventional roll crushers about 200 to 500 ppba), which requires laborious subsequent cleaning, or are uneconomical due to very complex machine configurations or laborious methods (for example shockwave comminution or thermal crushing).

When roll crushers are used, the suitable size of the feedstock depends on the angle of nip, and consequently on the dimensioning of the crushing machine. On account of the geometry of the rolls, it has so far only been possible to feed in fragments with a maximum edge length of <110 mm. In addition, a number of crushing cycles have been necessary to produce fine-particles products. For engineering reasons, roll crushers with hard-metal crushing tools have so far only been used with a roll diameter of ≦450 mm. Furthermore, roll maintenance is an additional cost factor. On account of the technical configuration of the hard-metal rolls, exchange or replacement of the rolls is very time-consuming and cost-intensive.

SUMMARY OF THE INVENTION

An object of the invention is to provide a roll crusher that is capable of comminuting coarsely crushed polycrystalline silicon at low cost and with low contamination. These and other objects are achieved by a roll crusher comprising a roll which rotates with a shaft (3), characterized in that the roll comprises a carrier roll (2) of steel and a number of hard-metal segments (1), wherein the hard-metal segments (1) consist of a cobalt matrix in which tungsten carbide is incorporated, and the hard-metal segments (1) are fastened on the carrier roll (2) reversibly with a form fit.

BRIEF DESCRIPTION OF THE DRAWINGS

FIGS. 1a and 1b schematically show a preferred embodiment of roll of a roll crusher according to the invention in side view and in section.

FIG. 2 shows a perspective view of a hard-metal segment of a roll of a roll crusher according to the invention.

DETAILED DESCRIPTION OF THE PREFERRED EMBODIMENTS

Figure 3:
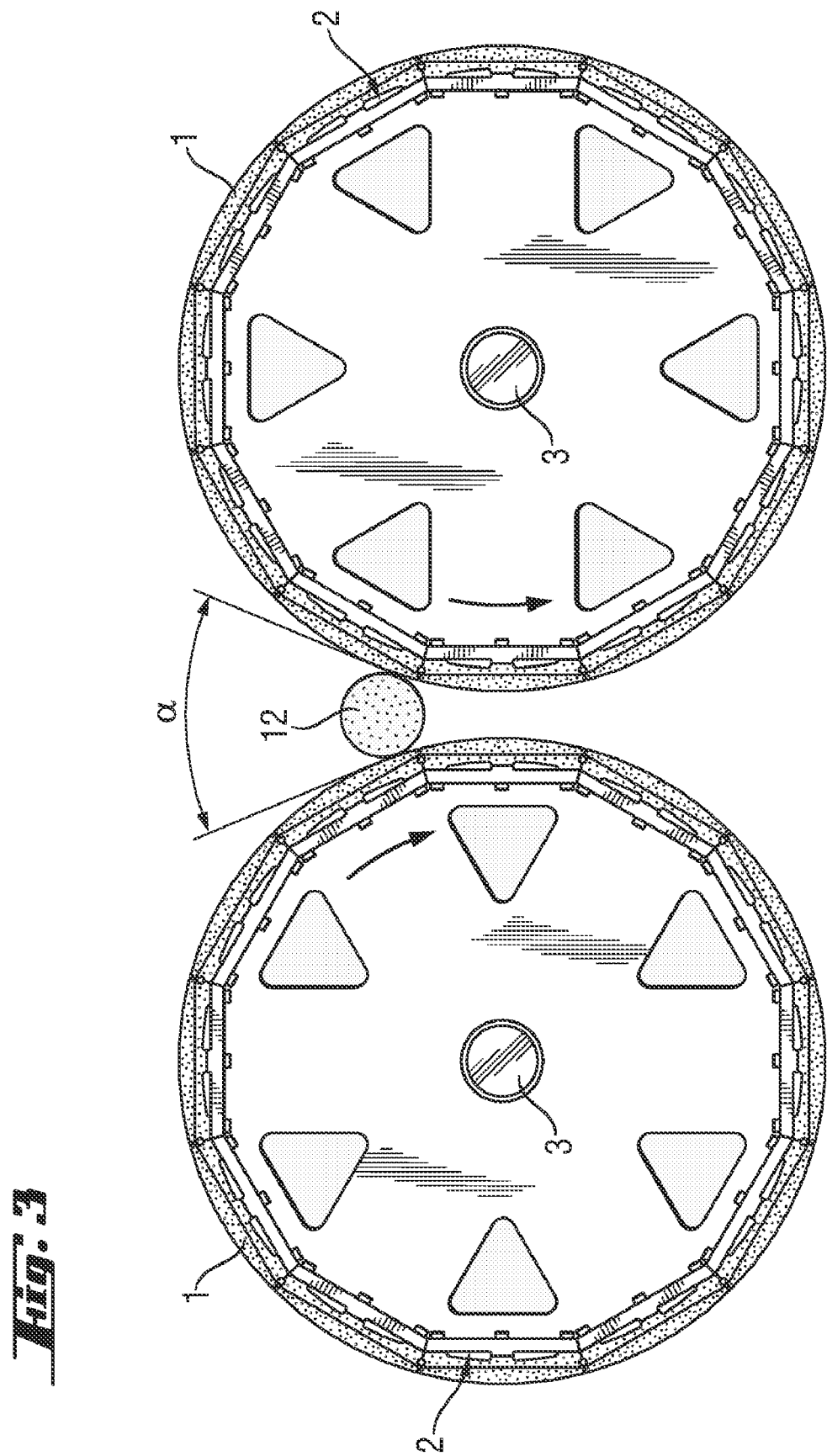
FIG. 3 schematically shows a roll crusher with two rolls and defines the crushing angle $\alpha$.

The segmented construction of the crushing rolls of the subject invention, comprising a number of hard-metal segments, has the effect that the roll and the roll crusher provided with the roll is very easy to maintain, since the hard-metal segments can be individually removed and exchanged without disassembling the roll. There are preferably 8 to 16, particularly preferably 12, hard-metal segments.

A hard-metal segment preferably consists of over 80% by weight, more preferably over 90% by weight, and most preferably 91.5% by weight of tungsten carbide, which is incorporated in a cobalt matrix. The hard-metal segment is preferably provided on its surface that forms part of the circumferential surface of the roll with a faceted finish. The facets act like feed-in fillets on the circumferential surface of the roll and improve the performance in terms of feeding in the material being crushed. Each hard-metal segment preferably has 3 to 12 facets, more preferably 4 to 7 facets, and most preferably 5 facets (5) (FIG. 2). All the edges of the hard-metal segment are preferably configured with a radius (6) (FIG. 2) to avoid edge breakouts from the hard-metal segment. The radius to prevent edge breakouts is preferably chosen to be from 2 mm to 5 mm.

The hard-metal segments are preferably sealed from one another with a very pure (i.e. non-metal-contaminating) plastic (7), which is introduced into the groove (8) between the segments (1). The entire roll is preferably also clad at the end faces with plates (4) of very pure plastic. The shaft (3), which rotates with the roll, is preferably clad with molded parts (9) of a very pure plastic. The cladding of the shaft (3), the end-face sealing of the roll carrier and the sealing between the individual hard-metal segments prevent contamination of the material being crushed with any metal contaminants. Most preferably, the plates (4) are fitted such that they are offset by at least 2 mm in relation to the end faces of the hard-metal segments (1), in order to avoid abrasion of the plastic by the material being crushed (FIG. 1b).

Polyethylene, polypropylene, polytetrafluoroethylene, polyurethane, ethylene tetrafluoroethylene copolymer, perfluoroalkoxy copolymer or Halar®, a copolymer of ethylene and chlorotrifluoroethylene (Solvay), are preferably used as the very pure plastic. Polyurethane is most preferably used.

The hard-metal segments (1) are preferably fastened on the carrier roll (2) by means of screws (10), wherein sintered internal threads (11) in the hard-metal segments (1) serve for fastening. Most preferably, the internal threads are configured as blind-hole threads, to avoid contamination of the crushed material with steel. This construction of the roll makes it possible in the case of repair to exchange only the damaged, screwed-on hard-metal segment.

The roll crusher preferably has two rolls. The rolls preferably have a diameter of from 1000 to 2000 mm.

The rolls are preferably arranged in the roll crusher in relation to each other in such a way that the crushing angle $\alpha$ has a value of from 40° to 45°. The "crushing angle" is to be understood for the purposes of the present invention as meaning the angle between the tangents to the hard-metal segments at the point of contact of the material being comminuted (12) at the beginning of the crushing operation (see FIG. 3).

Preferably, the rolls for a feedstock with a maximum edge length of from 100 mm to 250 mm have a diameter of from 1000 mm to 2000 mm. Most preferably, the rolls for a feedstock with a maximum edge length of from 180 mm to 220 mm have a diameter of from 1300 mm to 1700 mm. This dimensioning of the rolls is conducive to the feeding in of the polysilicon fragments. The dimensions and configuration of the rolls have the effect that lower forces are produced during crushing, with the result that the energy introduced can be transmitted more efficiently to the feedstock. Therefore, by virtue of the dimensioning of its rolls, the roll crusher according to the invention has a great crushing ratio, which reduces the number of times the material being crushed has to be passed through for it to be comminuted, and consequently simplifies the low-contamination comminution of polycrystalline silicon. The crushing ratio is in this case defined as the ratio of the maximum edge length of the feedstock to the maximum edge length of the product.

On account of the geometry mentioned, and the more favorable angle of nip in comparison with the prior art, the size of fragments that can be produced can be set over a greater range. The size distribution of the fragments is also reproducible.

A roll crusher according to the invention makes it possible to comminute a polysilicon feedstock with an edge length size of up to 250 mm. The feedstock is preferably crushed polysilicon suitable for solar applications with an edge length of from 80 to 200 mm. The fact that fragments of such a size can be used as feedstock means that the manual pre-comminution can be reduced to one working step, while further manual crushing steps can be eliminated.

In the roll crusher according to the invention, the average fragment size of the product can be set freely over a range from 10 mm to 150 mm. The fragment size of the product is in this case defined by way of the size of the crushing nip between the rolls. For a fragment size of from 60 to 110 mm, the crushing nip preferably has a size of from 45 to 55 mm. A reproducible fragment size distribution is ensured for all nip settings. This is not possible with a manual method of comminution.

Tests have shown that a nip of 50 mm on the roll crusher and a feedstock with a maximum edge length of 150 mm along with a roll diameter of 1000 mm produce a similar length distribution and weight distribution as in the case of current manual crushing methods. However, here the process is also reproducible.

The invention also relates to a method for comminuting coarse polysilicon by means of a crusher according to the invention.

This method is preferably characterized in that a crushed polysilicon material with an average fragment size of from 80 to 250 mm is fed to a crusher according to the invention and crushed to a respective desired target size in one pass with a crushing ratio greater than 5.

While a conventional method for comminuting a polysilicon rod obtained by the Siemens process to a crushed material with an edge length of 15 mm comprises initially two crushing steps by means of manual comminution (manual pre-comminution to a maximum fragment size of about 120 to 150 mm and subsequent manual post-comminution to a maximum fragment size of about 80 to 110 mm) and subsequently 3 to 4 crushing steps by means of conventional crushers, and consequently therefore a total of 5 to 6 crushing steps, a roll crusher according to the invention makes possible a method that achieves the same results in 2 to 3 crushing steps (manual pre-comminution to a fragment size of about 200 to 250 mm and one or two passes on the roll crusher according to the invention).

The desired target size is preferably 65 to 100 mm.

The grain size distribution of the crushed silicon material produced is comparable to the grain size distribution of a crushed material produced by manual methods, but the grain size distribution in the method according to the invention is also reproducible. Changing the nip between the rolls allows the average fragment size of the crushed polysilicon material produced to be specifically set. This is reproducible for all nip settings.

The method consequently makes it possible to maintain a reproducible comminuting ratio.

The throughput of the method according to the invention is increased in comparison with repeated manual comminution by a factor of about 5. The throughput of a crusher according to the invention for the feedstock described is about 10 t/h.

By contrast with manual post-comminution, the silicon does not have to be manually fixed in the method according to the invention. Consequently, the material being crushed is no longer infiltrated with sodium, iron, aluminum and PU.

A comparison of the contaminants of the comminuted product after mechanical crushing according to the invention and conventional manual crushing clearly shows the advantages of the method according to the invention:

The contamination by sodium is lower by a factor of 50, the contamination by tungsten lower by a factor of 2, by cobalt by a factor of 3 to 4 and by iron by a factor of 7 to 8. Apart from reduced infiltration of contaminants into the polysilicon, lowest possible variation of the degree of contamination is desirable for a reproducible process, since this has a very great effect on the quality of the silicon produced. In a method according to the invention, the variation of the materials mentioned is lower than in the case of conventional methods by a factor of 4 to 6. In the case of sodium, the variation is even lower by a factor of 20. Subsequent cleaning of the product is therefore not necessary.

By means of the method according to the invention, very pure crushed polysilicon material can consequently be produced with a narrower range of variation of contaminants and greater reproducible product variety than by means of manual methods, without giving rise to increased costs in the same way as by means of known mechanical methods.

The following example serves for further explanation of the invention:

Example: Comparison of a crushing method using a conventional crusher with a crushing method using a crusher according to the invention a) Conventional method: silicon rods with a diameter of about 180 mm were pre-crushed in the first manual crushing step to form fragments of about 200 mm in size. Subsequently, these fragments were manually crushed in a second crushing step to a maximum edge length of 110 mm. This starting material was then comminuted by means of a roll crusher with a roll diameter of 450 mm in four passes and crushed with different nip widths to an edge length of from 8 mm to 15 mm. Consequently, 2 manual working steps and also 4 mechanical working steps were necessary to produce the specific product.

b) Method according to the invention: silicon rods with a diameter of about 180 mm were pre-crushed in the first manual crushing step to form fragments of about 200 mm in size. These fragments with a maximum edge length of 200 mm were fed directly as feedstock to a roll crusher according to the invention, as represented in FIG. 1, with a roll diameter of 2000 mm. A first mechanical crushing step was carried out with a nip width of 40 mm. Subsequently, a further crushing step was carried out on the same crusher with a nip width of 8 mm. The same product as in a) was obtained in this way.

With the crusher/method according to the invention, a product produced with a conventional crusher in 6 steps can be produced with the same feedstock in only two crushing steps. Moreover, in multiple repetition, the method according to the invention exhibited lower contamination with Fe, Na, Al, W and Co and lower variation of the contamination.

The invention claimed is:

1. A method for comminuting coarse polysilicon, comprising feeding coarse polysilicon to a roll crusher comprising a roll which rotates about a shaft, the roll comprising a carrier roll of steel and a plurality of hard metal segments of a cobalt matrix in which tungsten carbide is incorporated, said hard metal segments reversibly fastened with a form fit onto an external surface of the roll which contacts the coarse polysilicon and forming a circumferential surface of the roll.

2. The method of claim 1, wherein the carrier roll has from 8 to 16 hard metal segments fastened thereto.

3. The method of claim 1, wherein the hard metal segments contain at least 80 weight percent tungsten carbide in the cobalt matrix, based on the weight of tungsten carbide and cobalt.

4. The method of claim 1, wherein the hard metal segments contain at least 90 weight percent tungsten carbide in the cobalt matrix, based on the weight of tungsten carbide and cobalt.

5. The method of claim 1, wherein the hard metal segments are provided with a faceted finish on their surface which forms the circumferential surface of the roll.

6. The method of claim 1, wherein the hard metal segments are sealed with respect to adjoining hard metal segments by a non-contaminating plastic positioned into a groove between the hard metal segments.

7. The method of claim 1, wherein roll ends are clad with plates of non-contaminating plastic.

8. The method of claim 1, wherein the hard metal segments are fastened reversibly on the roll by means of screws, wherein internal threads for receiving the screws are sintered into the hard metal segments.

9. The method of claim 1, wherein the roll has a diameter of from 1000 mm to 2000 mm.

10. The method of claim 1, wherein the roll crusher contains two rolls and coarse polysilicon is fed between the rolls.

11. The method of claim 1, wherein the coarse polysilicon comprises a crushed polysilicon having an average fragment size of 80 to 250 mm and is crushed by the roll crusher in one pass to a target size with a crushing ratio greater than 5.

12. The method of claim 6, wherein the non-contaminating plastic material is selected from the group consisting of polyethylene, polypropylene, polytetrafluoroethylene, polyurethane, ethylene tetrafluoroethylene copolymer, perfluoroalkoxy copolymer and ethylene/chlorotrifluoroethylene copolymer.

13. The method of claim 1, wherein exposed portions of the shaft are clad with a non-contaminating plastic.

* * * * *